Feb. 8, 1966 L. A. PAUL ETAL 3,233,763
MATERIAL HANDLING
Filed June 3, 1963 3 Sheets-Sheet 1

INVENTOR.
LOWELL A. PAUL
LOYD ADAMS
BY
Christie, Parker & Hale
ATTORNEYS.

INVENTORS.
LOWELL A. PAUL
LOYD ADAMS
BY
Christie, Parker & Hale
ATTORNEYS.

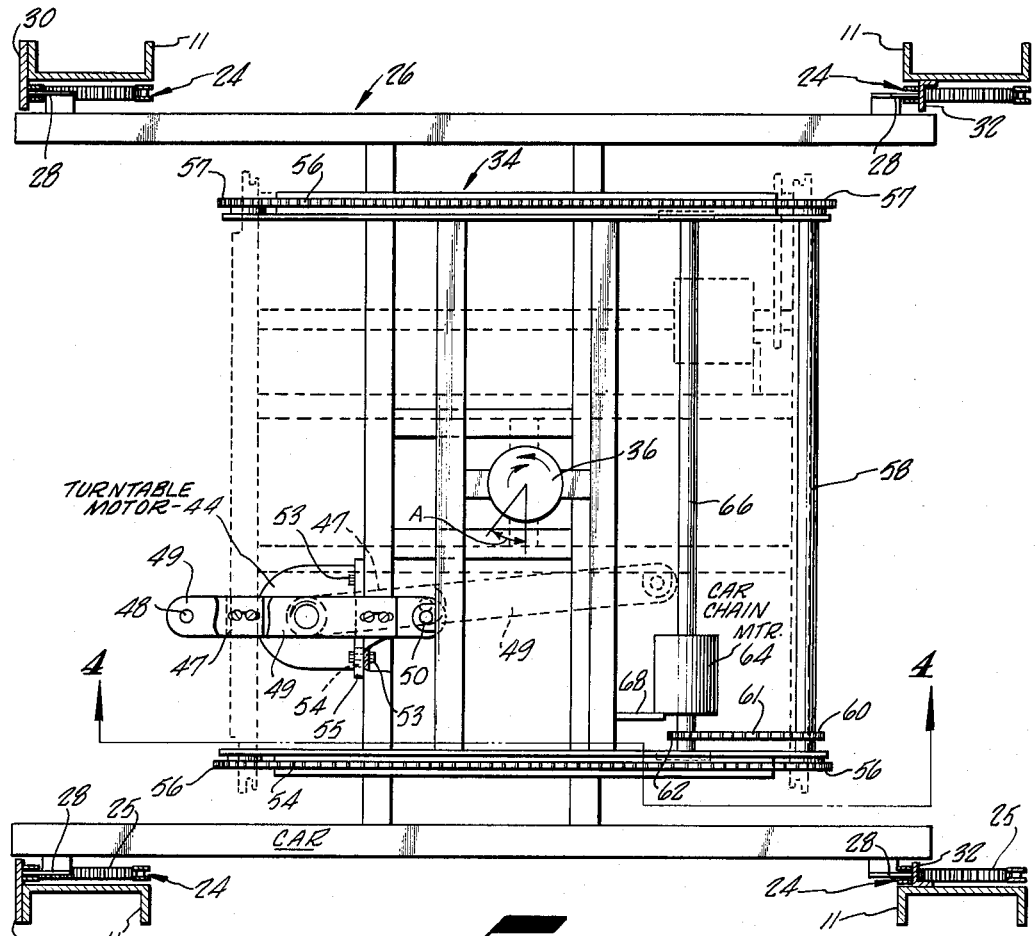
FIG_3_
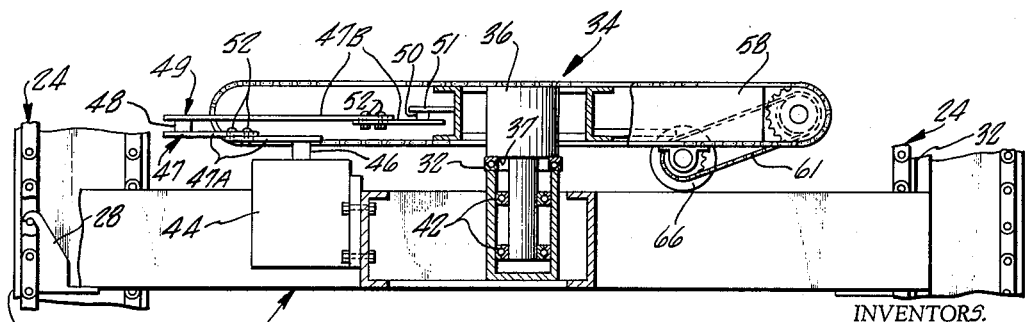
FIG_4_

United States Patent Office 3,233,763
Patented Feb. 8, 1966

3,233,763
MATERIAL HANDLING
Lowell A. Paul and Loyd Adams, Pasadena, Calif., assignors to Dakon-Adams Co., Los Angeles, Calif., a partnership
Filed June 3, 1963, Ser. No. 285,100
3 Claims. (Cl. 214—89)

This invention relates to apparatus for handling material, such as loaded pallets and the like.

It is often necessary in shipping or storing material such as sacks, containers, cartons, and the like, to transfer the material both horizontally and vertically. For example, it may be necessary to unload a freight car at one level, and store the unloaded material in a warehouse at a different level, which may be either above or below the freight car. When the material is stacked on pallets, it has been necessary in the past to unload the pallets by hand, handle the material individually to transfer it vertically, and then re-stack the material on pallets at the new elevation. Alternatively, one fork-lift truck has been used at one level to load pallets onto a freight elevator, and another fork-lift truck has been used at the other level to unload pallets from the elevator. This avoids unstacking and restacking material on the pallets at different levels, but is slow because each truck must wait for the elevator before it can either load or unload.

This invention provides apparatus for automatically transferring material horizontally and from one elevation to another on a substantially continuous basis, or without requiring breaking up of a stack of the material, if it is so arranged.

Briefly, the apparatus includes an upright tower, and a first elongated conveyor terminating adjacent the tower at one elevation for moving the material horizontally either toward or away from the tower. A second elongated conveyor is disposed to terminate adjacent the tower at a different elevation to move material horizontally away from or toward the tower. A car is suspended from the tower, and means are provided for raising and lowering the car between the two elevations. A conveyor is on the car for moving the material off of one of the conveyors and onto the car at one elevation and off the car and onto the other conveyor at the other elevation.

Sometimes it is necessary to load the car in one direction, and unload it in a transverse direction. In such instances, the car conveyor is preferably mounted on a turntable on the car so the conveyor can be rotated to be first in alignment with one of the conveyors adjacent the tower, and then aligned with the other conveyor adjacent the tower. In another form, the conveyor on the car is disposed in line with one of the conveyors, adapted to nest within and transverse to the other conveyor so that the material can be transferred from the car along transverse directions without requiring a rotatable turntable for the conveyor on the car.

Preferably, the conveyors used in this invention are endless belts or chains.

The preferred means for raising and lowering the car on the tower are hoisting chains secured to the car at spaced locations. Preferably, a plurality of chains or hoisting means are used, a separate elongated upright stop is disposed adjacent each chain to make sliding engagement with the car in two transverse horizontal directions to prevent the car from moving horizontally. Thus, as the car moves up and down it is prevented from swinging or twisting with respect to the supporting tower.

Preferably, a plurality of hoisting means are used for suspending the car from the tower, and they are spaced apart and disposed to support the car on opposite sides of a line along which material is moved by the first conveyor to or from the tower. The hoisting means are also arranged to support the car on opposite sides of a line along which material is moved from or to the car by the second conveyor. In a preferred embodiment the car is generally rectangular in plan view, and is supported at each of its four corners by a separate hoisting chain. Thus, material can be fed into or moved from the car on one side between a pair of chains, and be moved from or fed onto the car on an adjacent side of the car.

When the apparatus includes a turntable for aligning the conveyor on the car with the conveyors adjacent the tower, the turntable is preferably actuated by a crank which oscillates the car conveyor between the two required positions to be aligned with the two conveyors. The crank is arranged to move the turntable from one of the two positions to the other in more than one-half revolution of the crank, and to return the turntable to its original position in less than one-half revolution.

These and other aspects of the invention will be more fully understood from the following detailed description and the accompanying drawings, in which:

FIG. 3 is a view taken on line 3—3 of FIG. 1;

FIG. 4 is a view taken on line 4—4 of FIG. 3; and

Figure 1:
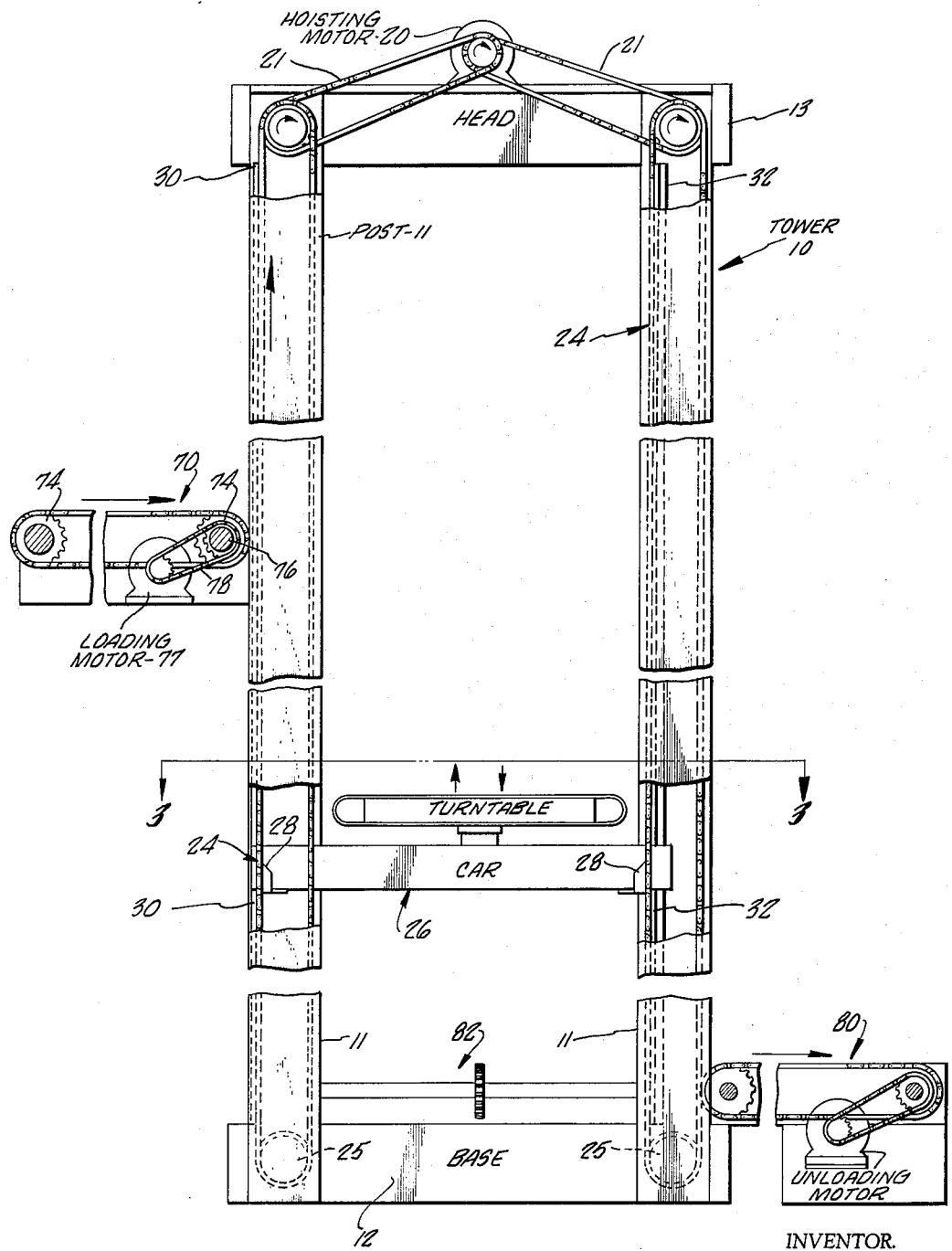
FIG. 1 is an elevation, partly broken away, of the presently preferred embodiment of the invention.
Figure 2:
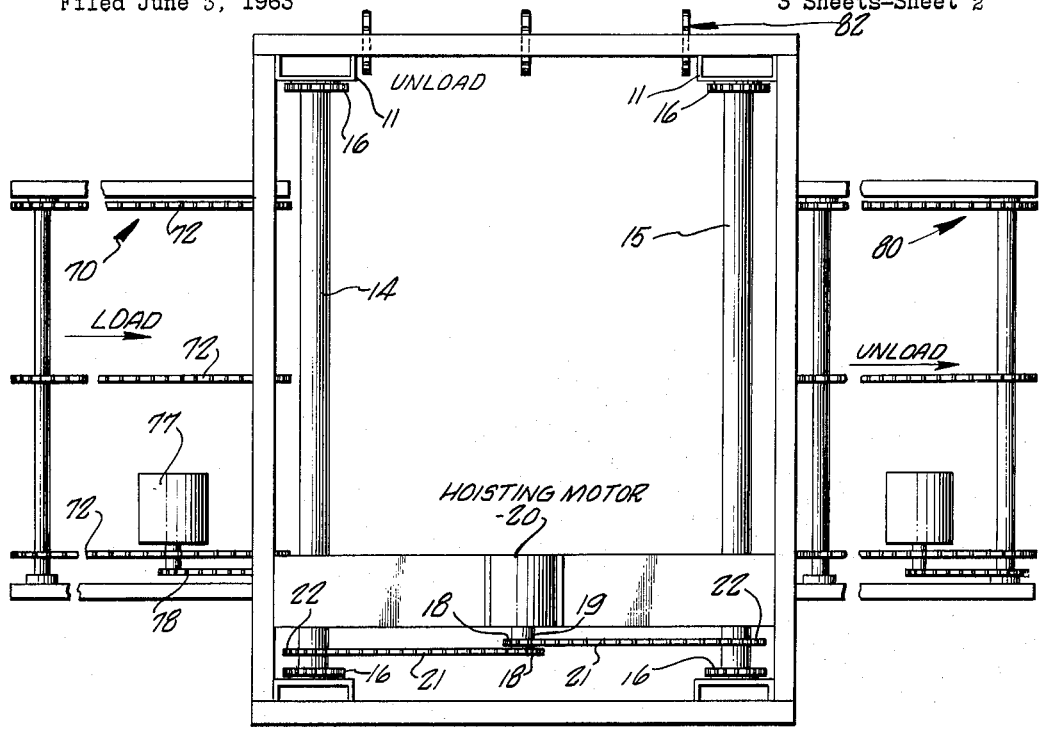
FIG. 2 is a plan view of the apparatus shown in FIG. 1, with the car and turntable not shown.

Referring to FIGS. 1 and 2, an upright tower 10 includes four vertical posts 11 secured at their lower ends to a base 12 and at their upper ends to a head 13 so that the tower is of a general rectangular configuration as viewed in plan (FIG. 2).

A pair of parallel and horizontal upper left and right (as viewed in FIG. 1) sprocket shafts 14, 15, respectively, are each journaled at their opposite ends in the upper ends of respective posts of the tower. A separate upper hoisting sprocket 16 is mounted on each end of each rotatable upper sprocket shaft. A pair of driving sprockets 18 are mounted on a shaft 19 of a hoisting motor 20 secured to the upper end of the tower. A separate driving chain 21 is disposed around each driving sprocket and around a respective driven sprocket 22 on each of the upper sprocket shafts, so that as the hoisting motor is operated the upper hoisting sprockets are turned.

A separate endless hoisting chain 24 is disposed around each upper hoisting sprocket, and around a separate respective lower hoisting sprocket 25 journaled in the lower end of a respective post of the tower. Thus, when the hoisting motor is turned in one direction, say clockwise (as viewed in FIG. 1), the hoisting chains are moved so that the outer portions of the chains on the sprockets on the left upper shaft are moved upwardly, and the inner portions of the chains around the sprockets on the right upper shaft are moved upwardly.

A horizontal flat car 26 of generally rectangular shape in plan view (see FIG. 3) is secured at each of its four corners by a separate respective hook 28 (see FIG. 4) to a respective portion of an adjacent hoisting chain. As shown best in FIG. 1, two of the car hooks are attached to the outer portion of hoisting chains which move up and down together, and the other two car hooks are attached to the inner portions of the hoisting chains which move up and down together, so that the car is either raised or lowered as the hoisting motor is turned clockwise or counterclockwise, as viewed in FIG. 1.

As shown best in FIG. 3, a separate upright, elongated plate 30 is secured to each of the posts which carry the left sprocket shaft. Each plate extends inwardly from its respective post to terminate adjacent the nearest respective corner of the car. The outer portion of each chain on the left sprocket slides against the respective inner face of the nearer plate 30 to prevent lateral movement of the chain and car in a horizontal direction normal to the axis of rotation of the hoisting motor. The inner edge of each plate 30 terminates closely adjacent the respective nearest side of the car to prevent the car from moving horizontally in a direction parallel to the axis of rotation of the hoisting motor.

A separate elongated, vertical angle plate 32 is welded to the inner face of each post which supports the right sprocket shaft. The inside face of the inner portion of each hoisting chain around the right upper sprockets slides against the respective inner face of the nearer angle plate 32. The inner edge of each angle plate 32 terminates adjacent the nearest side of the car. Thus, the angle plates 32 prevent the right chains from moving horizontally in a direction normal to the axis of rotation of the hoisting motor, and the inner ends of the angle plates 32 prevent the car from swinging or twisting in a horizontal plane in a direction parallel to the axis of rotation of the hoisting motor.

As shown best in FIGS. 2 and 3, a horizontal turntable 34 is mounted on top of the car to rotate on a downwardly extending spindle 36 rigidly secured to the central portion of the turntable. The lower end of the spindle is of reduced diameter to form a shoulder 37 which rests on a thrust bearing 38 on the upper end of an upwardly opening sleeve 40 rigidly secured to the car. A pair of aligning bearings 42 are disposed around the reduced lower end of the spindle in the sleeve.

A turntable motor 44 is secured to the car under the turntable, and includes an upwardly extending vertical shaft 46 rigidly connected to one end of the short horizontal turning link 47. The other end of the short link is connected by a vertical pivot pin 48 to one end of a long horizontal turning link 49, the other end of which is connected by a vertical pivot pin 50 to a bracket 51 on the turntable. The short and long turning links are each made up of a pair of sections 47A, 47B, respectively. Each pair of sections overlap at adjacent ends and are held together by bolts 52 disposed through longitudinal slots in the sections so the effective lengths of each of the links can be adjusted. The motor is secured to the car by bolts 53 extending through horizontal slots 54 in a base 55 for the motor so the motor can be moved in a direction parallel to the axis of rotation of the hoisting motor. Thus, the turntable motor shaft and links 47, 49 form a crank for rotating the turntable.

With the car in the position shown in FIG. 3, an angle A between a line passing through the center of the longitudinal axis of the spindle 36 and the vertical axis of pivot pin 50, and a line normal to the axis of rotation of the spindle and normal to the line passing through the axes of rotation of the turntable motor shaft 46 and pivot pin 50 is less than 45°. As shown in FIG. 3, angle A is about 40°. With this arrangement, when the turntable motor shaft is rotated in a counter clockwise direction (as viewed in FIG. 3), more than 180°, i.e., more than one-half revolution, the short and long links 47 and 49 are in the collinear position shown in dotted lines so the crank is at its maximum "throw" and the turntable is rotated at 90° in a counter clockwise direction from the solid to the phantom line position shown in FIG. 3. Continued rotation of the turntable motor in a counter clockwise direction for less than 180°, i.e., less than one-half revolution, restores the links to the solid line position shown in FIG. 3, and rotates the turntable in a clockwise direction (as viewed in FIG. 3) back to the solid line position. Thus, as the turntable motor is rotated continuously, or intermittently, in a clockwise direction, the turntable is oscillated through 90° between the solid and phantom line positions shown in FIG. 3.

A pair of endless chains 56 on opposite sides of the turntable act as a conveyor for material (not shown) resting on them. Each chain is disposed around a pair of sprockets 57, and the upper portion of each chain slides across the top of a separate respective support plate 58 carried by the turntable. Opposing sprockets at one end of the chains 56 are connected by common drive shaft 58, which carries a driven sprocket 60 that is driven by a drive chain 61 disposed around a driving sprocket 62 on a chain car motor 64. A solid rotatable horizontal shaft 66 is journaled at its opposite ends on the turntable and extends through the chain car motor to be rotated when the motor is actuated. A torque arm 68 is secured to the car chain motor and to the turntable to prevent the motor from rotating when it is actuated.

Returning to FIG. 1, a first or upper horizontal conveyor 70 terminates with one end adjacent the tower at an upper elevation. As shown in FIG. 2, the first or upper conveyor includes three laterally spaced chains 72 disposed around respective sprockets 74. One set of sprockets are mounted on a common drive shaft 76 which is driven by a first or loading motor 77 through a drive chain 78.

A second or lower horizontal conveyor 80 is disposed adjacent the lower end of the tower on the opposite side of the tower from the first conveyor, and extends away from the tower.

A third horizontal conveyor 82 is disposed with one end adjacent a side of a tower between the first and second conveyors, and is at the same level as the lower conveyor. The second and third conveyors are mutually perpendicular, and are substantially identical in construction with the first conveyor. Therefore they are not described in detail.

The operation of the apparatus is as follows:

Assume that loaded pallets (not shown) are to be brought in at upper levels and transferred to the lower level at which the second and third conveyors are located.

The hoisting motor 20 is operated to raise the car so that the conveyor or chains on the turntable are at the same level as the chains on the first conveyor, and the turntable motor is operated so that the turntable chains or conveyor extend in the same direction as those of the first conveyor. The first conveyor motor is turned on to move the pallets in the direction indicated by the arrow toward the tower. The car conveyor motor 64 is turned on to move the car chains in the same direction as the first conveyor. A loaded pallet (not shown) is moved by the first conveyor and the car conveyor onto the car turntable. The first conveyor motor and the car conveyor motor are turned off so that the pallet comes to a rest on the turntable. The hoisting motor is then operated to lower the car so that the upper level of the turntable conveyor or chains is at the same level as the chains in the second and third conveyor. If the pallet is to be unloaded on the second conveyor, the turntable is not rotated as it is lowered. On reaching the desired lower level, the second conveyor motor is turned on, and so is the car conveyor motor. The pallet on the turntable is then moved to the right, as viewed in FIG. 1, and transferred to the second conveyor.

To transfer the loaded pallet onto the third conveyor, which extends at right angles to the first and second conveyors, the turntable is rotated 90° in a counter clockwise direction (as viewed in FIG. 3) as the car is lowered by turning on the turntable motor and rotating its shaft in a counter clockwise direction (as viewed in FIG. 3) so that the car turntable and pallet are rotated 90° from the solid line position shown in FIG. 3. The chains on the turntable are now lined up with those on the third conveyor. The third conveyor is turned on, and so is the car conveyor, so that the pallet is transferred from the car onto the third conveyor.

After the pallet is removed from the car, the hoisting motor is again turned on and rotated in a direction to lift the car back to the same elevation as the first conveyor. During the hoisting of the car, the turntable motor is rotated in a counter clockwise direction to complete one revolution and return the short and long links to the position shown in FIG. 3, thereby rotating the turntable 90° in a clockwise direction as viewed in FIG. 3. The chains on the turntable are now aligned with the chains on the first conveyor, and the apparatus is ready to transfer another pallet to the lower level.

The circuitry for operating the motors for the conveyors, hoisting, and turntable, is conventional, and is not shown since it is obvious and well known to those skilled in the art.

The advantage of the turntable crank linkage is that with the turntable loaded, the turntable motor turns more than 180° to rotate the load 90°, and rotates through less than 180° to rotate the turntable back 90°. This reduces the load on the motor, and facilitates rapid return of the empty turntable to the loading position.

Figure 5:
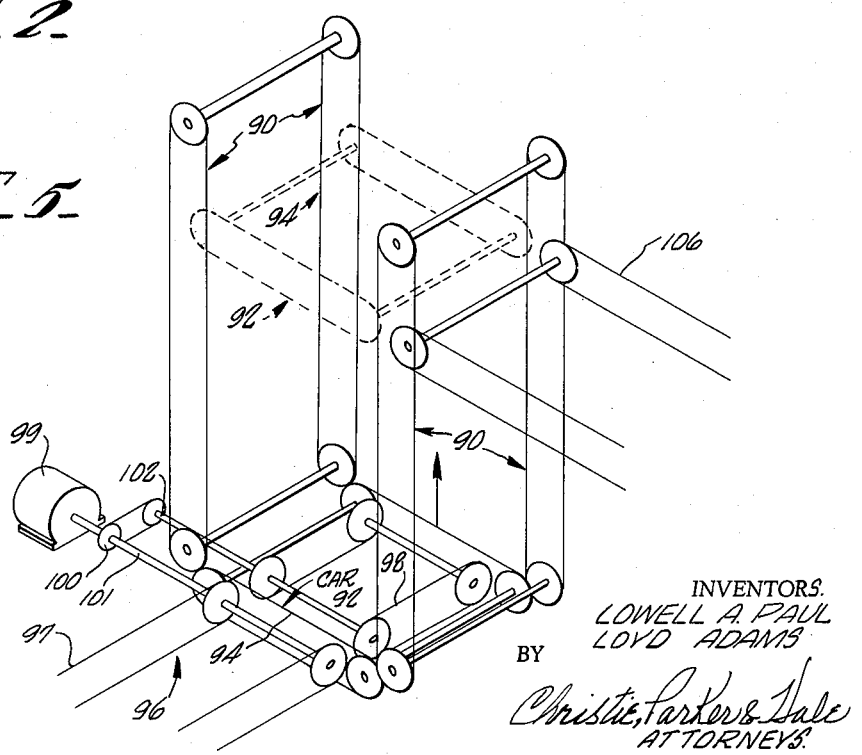
FIG. 5 is a schematic perspective of alternate apparatus in which material is transferred into and out of the tower at right angles without requiring the use of a turntable on the car.

FIG. 5 shows schematically an arrangement for transferring loads at right angels without requiring a turntable on the car. Four hoisting chains 90 are mounted substantially as described with respect to the hoisting chains in FIGS. 1 through 4. A car 92 is mounted to be moved up and down by the hoisting chains and carries a pair of conveyor chains 94. A first or lower conveyor 96 is disposed at substantially right angels to the chains on the car and is interrupted so that it includes an outer portion 97 and an inner portion 98 which lies within the chains on the car when the car is in a lowered position. The lower conveyor is driven by motor 99 and a transmission 100 which supplies power to a first drive shaft 101 to the chains on the first conveyor outside the car chains, and a second drive shaft 102 to the portion of the first conveyor within the car chains. With the car in lower position, as shown in FIG. 5, the car chains are at a slightly lower elevation than the first conveyor chains so that pallets and the like can be conveyed by the first conveyor over the car chains. The first conveyor is stopped with the load over the car, and the car is hoisted as described with respect to the apparatus in FIGS. 1 through 4. As the car raises, its chains lift the pallet or load to an upper level which is the same as that of a second conveyor 106 arranged to run in the same direction as the car chains. The car is stopped at the same level as the second conveyor, and the car chains are actuated to carry material off the car and onto the second conveyor, which is also moved on to convey material away from the tower. The car is then lowered back to the solid line position shown in FIG. 5, and the foregoing operation repeated to transfer loads from the lower to the upper level. To transfer loads from the upper to the lower level, the process is reversed.

We claim:

1. Apparatus for transferring material from one elevation to another, the apparatus comprising an upright rectangularly tower, a first reversible conveyor terminating adjacent the tower at one elevation, a second reversible conveyor terminating adjacent the tower at a different elevation the first and second conveyors extending from the tower at right angles with respect to each other, a car suspended from the tower, means for raising and lowering the car between the two elevations, a turntable on the car mounted to rotate about an upright axis, and a crank connected from a motor mounted on the car to the turntable for rotating the turntable, the crank being arranged to discontinuously oscillate the turntable between two fixed positions as the crank turns, and a reversible conveyor on the turntable for moving the material off one of the conveyors and onto the car at one elevation and off the car and onto the other conveyor at the other elevation.

2. Apparatus for transferring material from one elevation to another, the apparatus comprising an upright tower, a first conveyor terminating adjacent the tower at one elevation, a second conveyor terminating adjacent the tower at a different elevation, a car suspended from the tower, means for raising and lowering the car between the two elevations, a turntable on the car mounted to rotate about an upright axis, and a crank connected to the car and turntable for rotating the turntable, the crank being arranged to oscillate the turntable between first and second positions as the crank turns, the crank being constructed and disposed to require more than one-half revolution to move the turntable from the first to the second position, and less than one-half revolution to return the turntable from the second to the first position, and a conveyor on the car for moving the material off one of the conveyors and onto the car at one elevation and off the car and onto the other conveyor at the other elevation.

3. Apparatus for transferring material from one elevation to another, the apparatus comprising:
   an upright rectangular tower,
   a first reversible conveyor terminating adjacent the tower at one elevation,
   a second reversible conveyor terminating adjacent the tower at a different elevation, the first and second conveyors extending from the tower at right angles with respect to each other,
   a rectangular car suspended from the tower,
   means for raising and lowering the car between the two elevations,
   a turntable on the car mounted to rotate about an upright axis,
   a crank connected to the car and turntable for rotating the turntable, the crank being arranged to oscillate the turntable between first and second positions as the crank turns, the crank constructed and disposed to require more than one-half revolution to move the turntable from the first to the second position, and in less than one-half revolution to return the turntable from the second to the first position, and
   a reversible conveyor on the car for moving the material off one of the conveyors and on to the car at one elevation and off the car and on to the other conveyor at the other elevation.

References Cited by the Examiner

UNITED STATES PATENTS

| 1,553,063 | 9/1925 | Bedgood | 212—69 |
| 1,925,442 | 9/1933 | Fournier | 214—95 X |
| 2,656,940 | 10/1953 | Summers. | |
| 2,718,312 | 9/1955 | Pilch | 212—66 |
| 2,774,489 | 12/1956 | Guigas. | |
| 3,047,095 | 7/1962 | Bell. | |

FOREIGN PATENTS

| 1,183,232 | 1/1959 | France. |
| 466,079 | 9/1928 | Germany. |

HUGO O. SCHULZ, *Primary Examiner.*

MORRIS TEMIN, *Examiner.*